Aug. 6, 1940.                F. W. PEEL                2,210,000
           CONTINUOUS PROCESS OF MANUFACTURING RUBBER TUBING
                    Filed Oct. 25, 1935        2 Sheets-Sheet 1
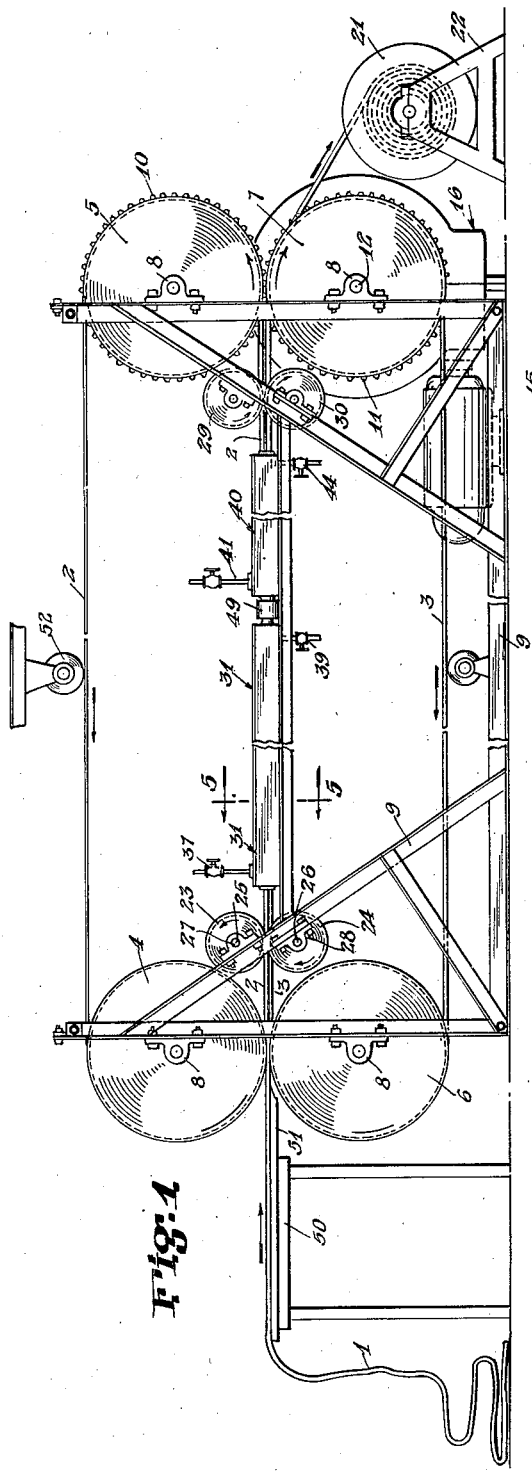
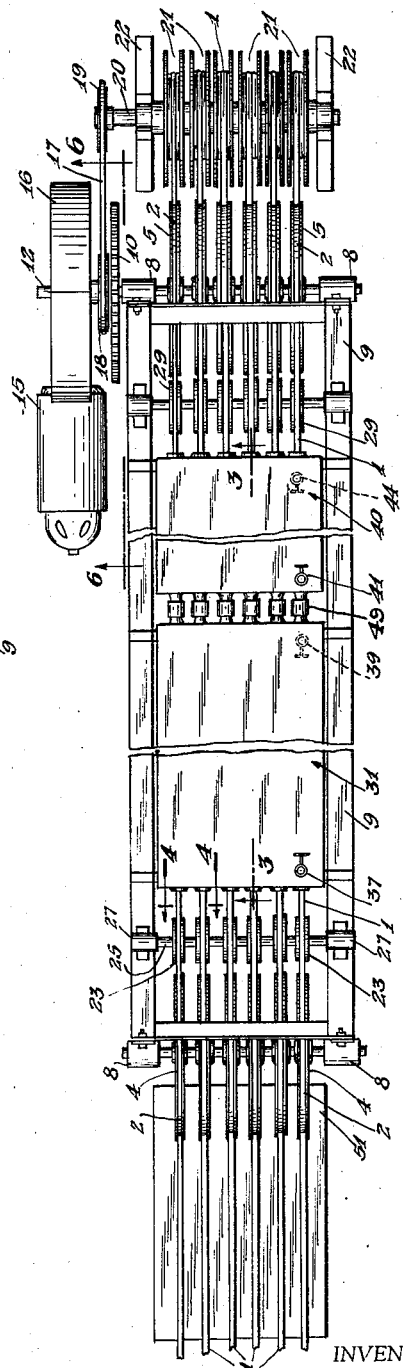
INVENTOR.
Frederick W. Peel
BY
Samuel Ostrolenk
ATTORNEY.

Aug. 6, 1940. F. W. PEEL 2,210,000
CONTINUOUS PROCESS OF MANUFACTURING RUBBER TUBING
Filed Oct. 25, 1935 2 Sheets-Sheet 2
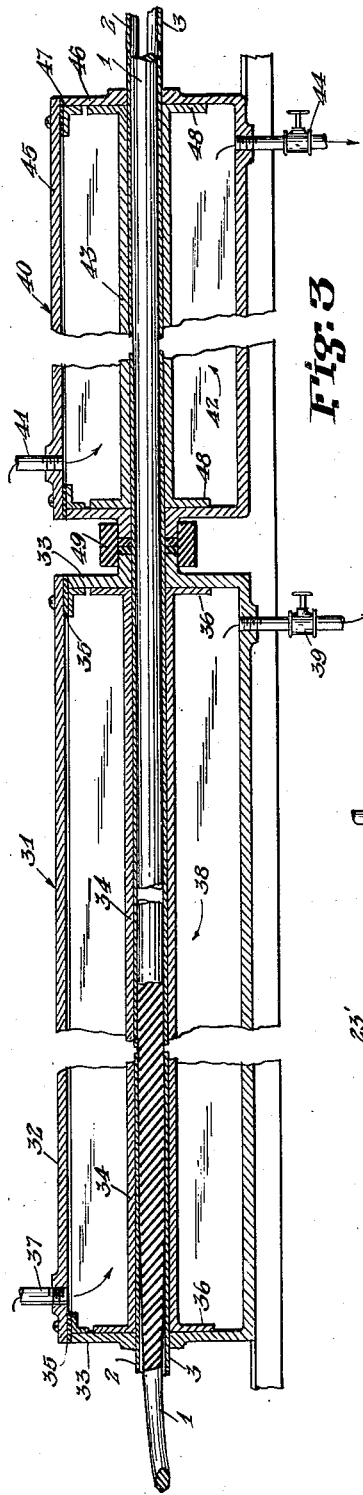
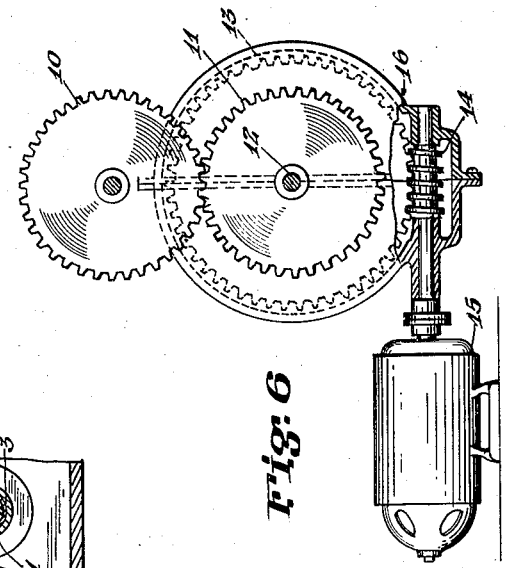
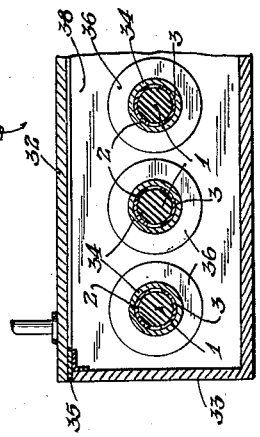
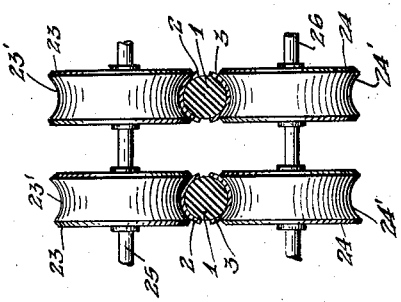
INVENTOR.
Frederick W. Peel
BY Samuel Ostrolenk
ATTORNEY.

Patented Aug. 6, 1940

2,210,000

UNITED STATES PATENT OFFICE 2,210,000

CONTINUOUS PROCESS OF MANUFACTURING RUBBER TUBING

Frederick W. Peel, Bedford, Va., assignor to Rubatex Products, Inc., New York, N. Y., a corporation of Delaware Application October 25, 1935, Serial No. 46,677

6 Claims. (Cl. 18—53)

My invention relates to a novel method of and apparatus for manufacturing gas expanded rubber tubing.

In the manufacture of gas expanded rubber products it is the practice to utilize individual molds. Where long continuous lengths of such products are required it becomes quite a problem to provide suitable molds for the final heat treatment and formation. The rubber dough is gassed with an inert gas at high pressure and is then heat treated for final vulcanization and expansion. It is necessary to cool the vulcanized rubber before releasing the pressure of the molds enclosing it.

It is an object of my invention to provide a novel method in the production of gas expanded rubber tubing in a continuous manner.

It is another object of my invention to provide novel apparatus in the manufacture of gas expanded rubber for heat treating and cooling rubber tubing in a continuous manner.

It is a further object of my invention to provide novel apparatus in the manufacture of gas expanded rubber in a continuous manner wherein endless steel bands serve to convey rubber tubing through vulcanizing chambers and also serve as a mold for the tubing.

These and other objects of my invention will become apparent in the following description in connection with the drawings, in which:

Figure 1 shows an elevation of a preferred embodiment of apparatus according to my invention;

Figure 2 is a plan view of this apparatus;

Figure 3 is the sectional view 3—3 taken through Figure 2, showing a detail of the vulcanizing chambers;

Figure 4 is the view 4—4 of Figure 3, showing the action of the forming wheels for the steel bands;

Figure 5 is the partial sectional view 5—5 of Figure 1, showing a section through the rubber tubing as it is fed through the apparatus;

Figure 6 illustrates the driving mechanism for my preferred embodiment and is the view 6—6 of Figure 2.

The composition of the rubber tubing of my invention may consist of the following ingredients compounded in the indicated proportions by weight:

|  | Pounds | Ounces |
|---|---|---|
| Smoked rubber sheets | 50 | 0 |
| Zinc oxide | 3 | 7 |
| Whiting | 15 | 0 |
| Light calcined magnesia | 8 | 0 |
| Sulphur | 1 | 0 |
| Carbon black | 1 | 0 |
| Paraffin wax | 1 | 8 |
| Agerite powder |  | 10 |
| Heliozone |  | 4 |
| Diphenylguanidine |  | 5 |
| Captax |  | 1¾ |

Reasonable changes in these proportions, or in the specified components are entirely feasible. The ingredients are individually mixed on the mill in a manner well known in the art of rubber compounding. The individual sheets of rubber are masticated or softened into a single soft mass by masticating rollers which are heated to a temperature of 150° F. The dough or rubber mix is prepared in the manner described in the application, Serial No. 717,550, filed March 27, 1934, of which I am a co-inventor.

The dough is then formed into a tubular shape. A very practical method for producing continuous rubber tubing is to extrude it by means well-known in the mechanical arts. The rubber tubing may be made in twenty foot lengths. The individual rubber lengths are then placed in an autoclave chamber and an inert gas, such as nitrogen, is applied at a pressure of about 3500 pounds per square inch after the air therein has been exhausted to a vacuum of about five inches of mercury. It is necessary to keep the rubber lengths from contacting or otherwise interfering with each other. Any one of several methods well known in the art may be employed. These tubes may, for example, be placed in individual metal tubing and the metal tubes containing them inserted in an autoclave; or the rubber lengths may be piled in individual layers and bundled together for insertion into the autoclave.

While the gas is being forced into the rubber in the autoclave, steam at several pounds per square inch pressure is admitted to the steam chest of the autoclave. The rubber at this stage is soft and plastic and, therefore, readily absorbs the gas that it is exposed to under pressure.

The steam produces a temperature at which partial vulcanization proceeds to a substantially uniform degree throughout the body of the rubber tubing. The rubber is here partially vulcanized so that it may retain the gas that it adsorbs when removed from the autoclave.

The autoclave is then permitted to cool off under atmospheric conditions and cold water is then forced through the steam jacket till a temperature between 60° and 70° F. is reached. The rubber tubing in a semi-cured state is thus permitted to set. The excess gas in the autoclave is now removed and the rubber tubing, being partially cured, will hold the gas in its individual cells. The rubber tubing is then removed as individual semi-cured twenty foot lengths. The reduction of the gas pressure causes the original diameter of the rubber tubing to somewhat increase since the gas in the cellular structure of the rubber expands.

Other compositions for the rubber dough may be used and my process is applicable to sponge rubber tubing as well as to a product having an individual gas cellular structure. The original gas cells in sponge rubber are caused to expand until they rupture or communicate to adjacent cells and it, therefore, has no individual cellular structure. Sodium bicarbonate is generally added to the rubber for "blowing" it in the production of sponge rubber. Thus, for example, in the apparatus hereinafter described in detail, the circular molds for the rubber tubing may have a ½ inch internal diameter and when sponge rubber is to be produced the diameter of the tubing before final heat treatment may be ⅛ inch so that it may expand to form a ½ inch sponge rubber product; but when rubber tubing having an individual cellular structure is to be made, its diameter before final vulcanization would be about ⅜ inch to produce a ½ inch resultant diameter.

These twenty foot lengths of rubber tubing are introduced into a plurality of vulcanizing sections in the apparatus according to my invention. Although automatic means may be employed, manual operation is used to simplify the procedure as herein described. The rubber tubing 1, after being introduced into the left end of the apparatus as viewed in Figures 1 and 2, is laid across a small table 50 in front of the machine having an extension 51 which extends close to the machine. Although I have only illustrated six vulcanizing sections, a larger number may be used. As the twenty foot lengths pass through the machine, it is necessary, in order to keep the process continuous, to attach the end of another twenty foot length to one that is practically consumed. These ends are readily attached by means of any well known rubber cement.

I have shown a plurality of vulcanizing units in my preferred embodiment. Each unit is comprised essentially of two co-acting endless steel bands 2 and 3. Steel band 2 is wound around the narrow drums 4 and 5; and the steel band 3 around drums 6 and 7. These drums are rotatably mounted on shafts which are supported in bearings 8 attached to the frame 9. The endless belts are motivated by means of the co-acting gears 10 and 11 which drive the drums 5 and 7. Gear 11 is keyed to the shaft 12 (Figure 6), to which is also keyed gear 13 which is driven by worm gear 14 connected to a motor drive 15. A housing 16 encloses the worm gear drive. A belt 17 and pulley system 18 and 19 connected to the drive shaft 12 serve to rotate the shaft 20 upon which reels 21 are mounted. The speed of the bands, and therefore the rate of progress of the rubber tubing 1 through the apparatus is determined by the speed of the motor drive 15 and the ratios of the several gears. The co-acting gears 10 and 11 are of equal diameter, so that the bands 2 and 3 travel at a common rate.

The shaft 20 and reels 21 are supported by a frame 22. The steel bands 2 and 3 may, for example, be ⅝ inch wide, and when they pass the forming wheels 23 and 24 are made to assume a concave or arced shape. A detail of this operation is seen in Figure 4. The steel bands 2 and 3 are here shown bent around the rubber tubing 1 between them. These forming wheels 23 and 24 have concave surfaces 23' and 24' to effect the forming. The plurality of wheels 23 and 24 are keyed to corresponding shafts 25 and 26 which are mounted in bearings 27 and 28 attached to the frame 9. A corresponding set of forming wheels 29 and 30 are mounted at the opposite end of the vulcanizing chambers to assist in the maintenance of the concave shape of the steel bands 2 and 3 as they encircle the rubber tubing. An idler pulley 52 presses against the endless band 2, as shown in Figure 2, to keep it taut, and a corresponding idler pulley 53 presses against the band 3.

The rubber tubing 1 is inserted between the co-acting steel bands 2 and 3 at the left of the machine, and after the bands are formed by the wheels 23 and 24 continues through to the steam chamber 31. This steam chamber 31 comprises a common steam chest formed by a top plate 32 attached to the structure 33 in which a plurality of pipes 34 are affixed as shown in sectional view Figure 3. A gasket 35 is used to seal the joint of the plate 32 to the structure 33. The pipes 32 have flanges 36 at their ends. These flanges may be riveted or welded onto the structure 33. The internal diameter of the pipe 34 is determined by the diameter of the finally vulcanized rubber tubing product. The co-acting steel bands 2 and 3 pass through the piping 34 in the steam chest and carry the rubber tubing 1 along at a predetermined rate.

Steam is admitted through the steam inlet valve 37, circulates through the steam chamber 38 around the piping 34 and out through the steam outlet valve 39. The steam pressure used depends upon the composition of the material being vulcanized. The heat of the steam is transmitted through the pipes 34 to the gassed rubber product which is passing through it. The gassed rubber tubing 1 which before vulcanization is usually of smaller diameter than the pipe 34, as is shown at the right end of Figure 3, becomes heated and expands to fill the interior of the piping 34 so that the steel bands 2 and 3 press against the inside surface of the pipes 34. The bands continue to move the rubber tubing through the heated chambers until the rubber is thoroughly vulcanized and expanded.

The piping 34 acts as a continuous circular mold for the rubber tubing. The bands 2 and 3 and the pipes 34 should be polished and oiled along their contacting surfaces to minimize their frictional resistance. Figure 5 is a partial sectional view showing the rubber tubing 1 with the bands 2 and 3 encircling it inside the pipes 34. The flanges 36 of the pipes 34 are shown in this figure.

It is generally necessary to cool the expanded and vulcanized rubber before releasing the pressure on it, or further expansion might occur to distort or rupture the product. Accordingly, I provide a cooling chamber 40, constructed similar to the steam chamber 31. Cooling water enters through valve 41 to the interior 42, and circulates about the plurality of piping 43, and passes on through the outlet 44. The cover plate 45 is attached to the structure 46, with a gasket 47 between. The pipes 43 have flanges 48 at their ends which are attached to the structure 46. I have shown the steam and water chambers, 31 and 40, spaced, to avoid any parasitic heat loss between them. Heat insulating blocks 49 are placed between these chambers as shown in Figure 3. These blocks 49 have a central bore equal to the inside diameter of the pipes 34 and 43, in order to maintain the pressure on the steel bands 2 and 3 as they pass between the chambers 31 and 40.

As the vulcanized rubber tubing 1 is conveyed through the tube 43 the circulating water sufficiently cools it to permit its discharge at the right end of the apparatus, onto the reels 21.

The relative lengths of the steam chamber 31 and water chamber 40 are optional but I prefer to make the steam chamber 31 about twice as long as the water chamber 40.

Although I have shown a common steam chest for the plurality of pipes 34, it is also feasible to use a concentric pipe system around each pipe and circulate the steam between these pipes to heat the pipe 34. This also applies to the common water chamber 40 surrounding the plurality of pipes 43.

I have limited my description to expanded rubber tubing but it may equally well be employed for continuously vulcanizing other moldable materials. I have also described the conventional method for gassing and semi-curing the rubber dough in an autoclave after the rubber dough has been extended or formed as tubing. To make the manufacture of tubing according to my invention wholly automatic and continuous, it is feasible to first gas and semi-cure a bulk of rubber dough in an auto-clave and then extrude the gassed and semi-cured rubber dough in tubular or strip form. As the tubing is extruded, it is introduced to the apparatus of this invention as hereinabove described, so that it may continue through and be vulcanized and expanded to its final form.

Although I have described a particular embodiment of an apparatus according to my invention, several modifications may be made by one skilled in the art, which fall within the broader spirit and scope of my invention, and I do not intend to be limited for example, by the shape of the extruded gassed rubber tubing which may well be in the form of flat strips instead of a circular section before vulcanization to the circular form, or by the shape of the final vulcanized product, but only as set forth in the following claims.

I claim:

1. A process for manufacturing rubber strips which comprises the steps of gassing rubber; partially vulcanizing and expanding the rubber; extruding the rubber in the form of a rubber tube; feeding the rubber tubing through a series of receiving chambers; heating one of the chambers for expanding the rubber as it is being fed therethrough; and cooling the other of the chambers for cooling the rubber before it passes out of the chambers.

2. A process for manufacturing rubber strips which comprises the steps of gassing rubber; partially vulcanizing and expanding the rubber; extruding the rubber in the form of a rubber tube; feeding the rubber tubing through a series of receiving chambers; heating one of the chambers for expanding the rubber as it is being fed therethrough; and cooling the other of the chambers for cooling the rubber before it passes out of the chambers; and cementing a new end of a second rubber tube to the receding end of the first tube; and feeding the second rubber tube through the receiving chambers.

3. A process for the manufacture of cellular rubber strips which comprises the steps of gassing rubber, partially vulcanizing the rubber, expanding the rubber, extruding the rubber to form a strip, heating the rubber to further expand and completely vulcanize it and finally cooling the vulcanized cellular rubber strip.

4. A process for manufacturing closed cell gas expanded rubber strips which comprises the steps of gassing rubber; partially vulcanizing and expanding the rubber; extruding the rubber in the form of a rubber tube; feeding the rubber tubing through a series of receiving chambers; heating one of the chambers for expanding the rubber as it is being fed therethrough; and cooling the other of the chambers for cooling the rubber before it passes out of the chambers.

5. A process for manufacturing closed cell gas expanded rubber strips which comprises the steps of gassing rubber; partially vulcanizing and expanding the rubber; extruding the rubber in the form of a rubber tube; feeding the rubber tubing through a series of receiving chambers; heating one of the chambers for expanding the rubber as it is being fed therethrough; and cooling the other of the chambers for cooling the rubber before it passes out of the chambers; and cementing a new end of a second rubber tube to the receding end of the first rubber tube; and feeding the second tube through the receiving chambers.

6. A process for the manufacture of closed cell cellular rubber strips which comprises the steps of gassing rubber; partially vulcanizing the rubber; expanding the rubber; extruding the rubber to form a strip; heating the rubber to further expand and completely vulcanize it and finally cooling the vulcanized closed cell cellular rubber strip.

FREDERICK W. PEEL.